United States Patent
Lim et al.

(10) Patent No.: US 11,722,199 B2
(45) Date of Patent: *Aug. 8, 2023

(54) METHOD FOR SUPPORTING BEAM CORRESPONDENCE AND APPARATUS THEREOF

(71) Applicant: LG ELECTRONICS INC., Seoul (KR)

(72) Inventors: Suhwan Lim, Seoul (KR); Jaehyun Park, Seoul (KR); Sangwook Lee, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,008

(22) Filed: Sep. 24, 2021

(65) Prior Publication Data
US 2022/0014254 A1 Jan. 13, 2022

Related U.S. Application Data

(63) Continuation of application No. 16/789,055, filed on Feb. 12, 2020, now Pat. No. 11,146,322.

(30) Foreign Application Priority Data

Feb. 15, 2019 (KR) .................. 10-2019-0018175
Mar. 29, 2019 (KR) .................. 10-2019-0037440

(51) Int. Cl.
*H04B 7/06* (2006.01)
*H04B 7/26* (2006.01)
(Continued)

(52) U.S. Cl.
CPC ....... *H04B 7/0695* (2013.01); *H04B 7/18513* (2013.01); *H04B 7/2693* (2013.01); *H04B 17/102* (2015.01); *H04W 8/22* (2013.01)

(58) Field of Classification Search
CPC ............... H04B 7/0695; H04B 7/2693; H04B 7/18513; H04B 17/102; H04W 8/22; H04W 8/24; H04L 5/0053; H04L 5/0023
(Continued)

(56) References Cited

U.S. PATENT DOCUMENTS

2018/0249453 A1 8/2018 Nagaraja
2019/0363843 A1* 11/2019 Gordaychik .............. H04L 1/08
2020/0059867 A1* 2/2020 Haghighat .......... H04W 52/242

OTHER PUBLICATIONS

ETSI, 5G NR User equipment (UE) radio transmission and reception, Oct. 2018, Global Initiative, TS 138 101-2 V15.3.0, pp. 17 and 31-40.
(Continued)

*Primary Examiner* — Kwang B Yao
*Assistant Examiner* — Syed M Bokhari
(74) *Attorney, Agent, or Firm* — Dentons US LLP

(57) ABSTRACT

There is provided for supporting beam correspondence. The method may be performed by a user equipment (UE) and comprise: transmitting UE capability information to a base station. The UE capability information may include first information related a capability of supporting beam correspondence. The beam correspondence may be determined based on at least a beam correspondence tolerance requirement. The beam correspondence tolerance requirement may include a delta effective isotropic radiated power (EIRP) of 3 dB.

13 Claims, 21 Drawing Sheets

UE gNB

UE Capability Information
(UE capable of beam correspondence)

(51) Int. Cl.
*H04W 8/22* (2009.01)
*H04B 7/185* (2006.01)
*H04B 17/10* (2015.01)

(58) Field of Classification Search
USPC .......................................................... 370/329
See application file for complete search history.

(56) References Cited

OTHER PUBLICATIONS

U.S. Appl. No. 16/789,055, filed Feb. 12, 2020.

* cited by examiner

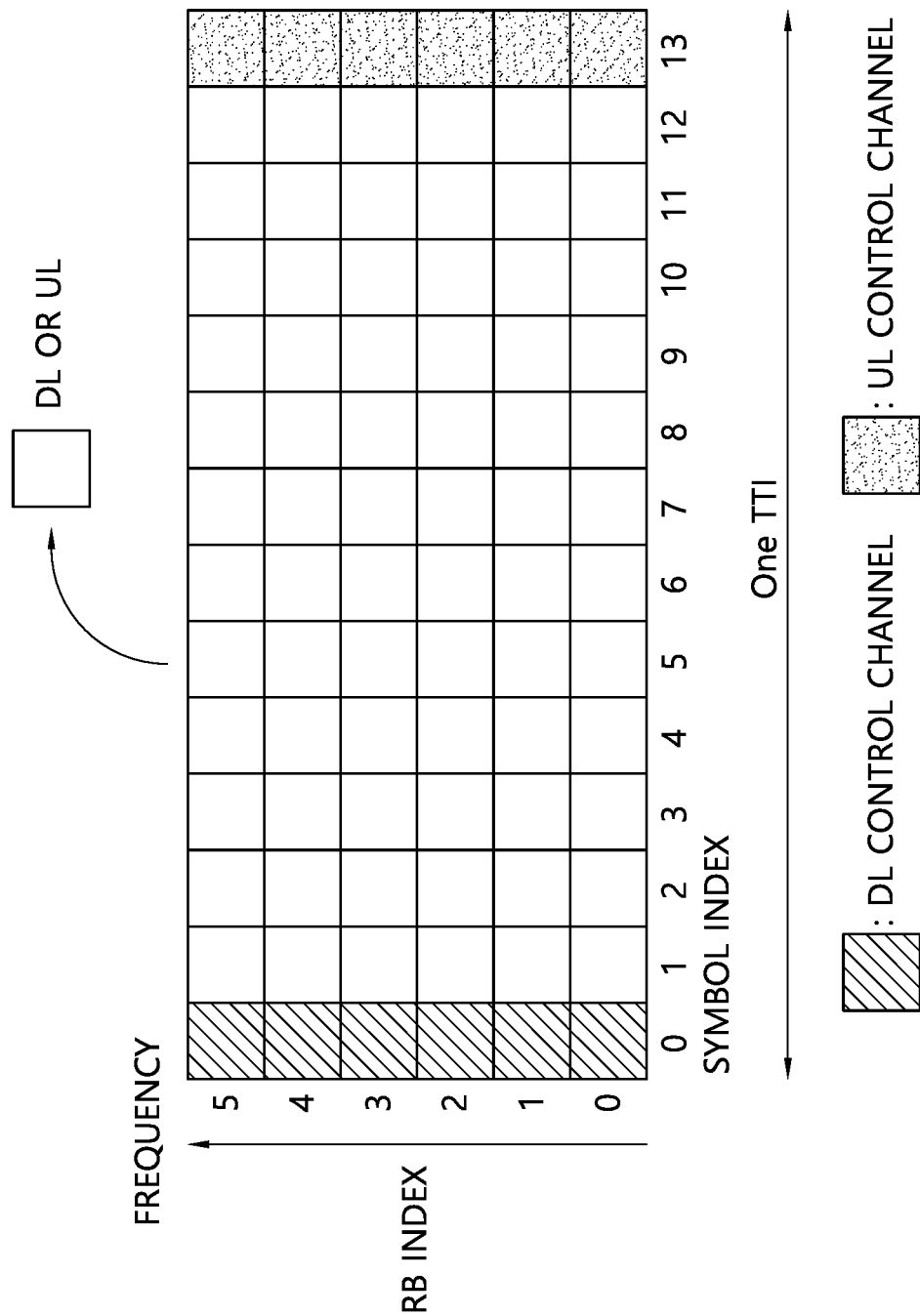

Case A          Case B

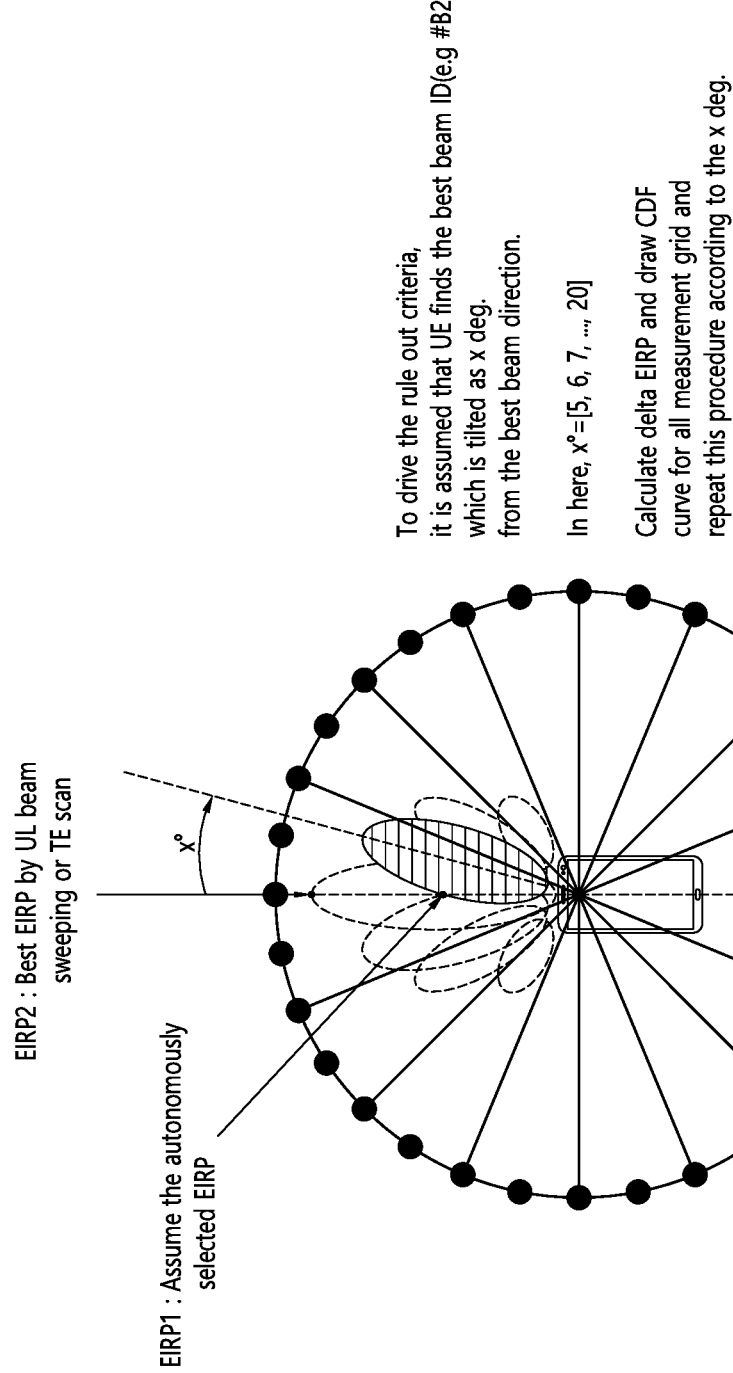

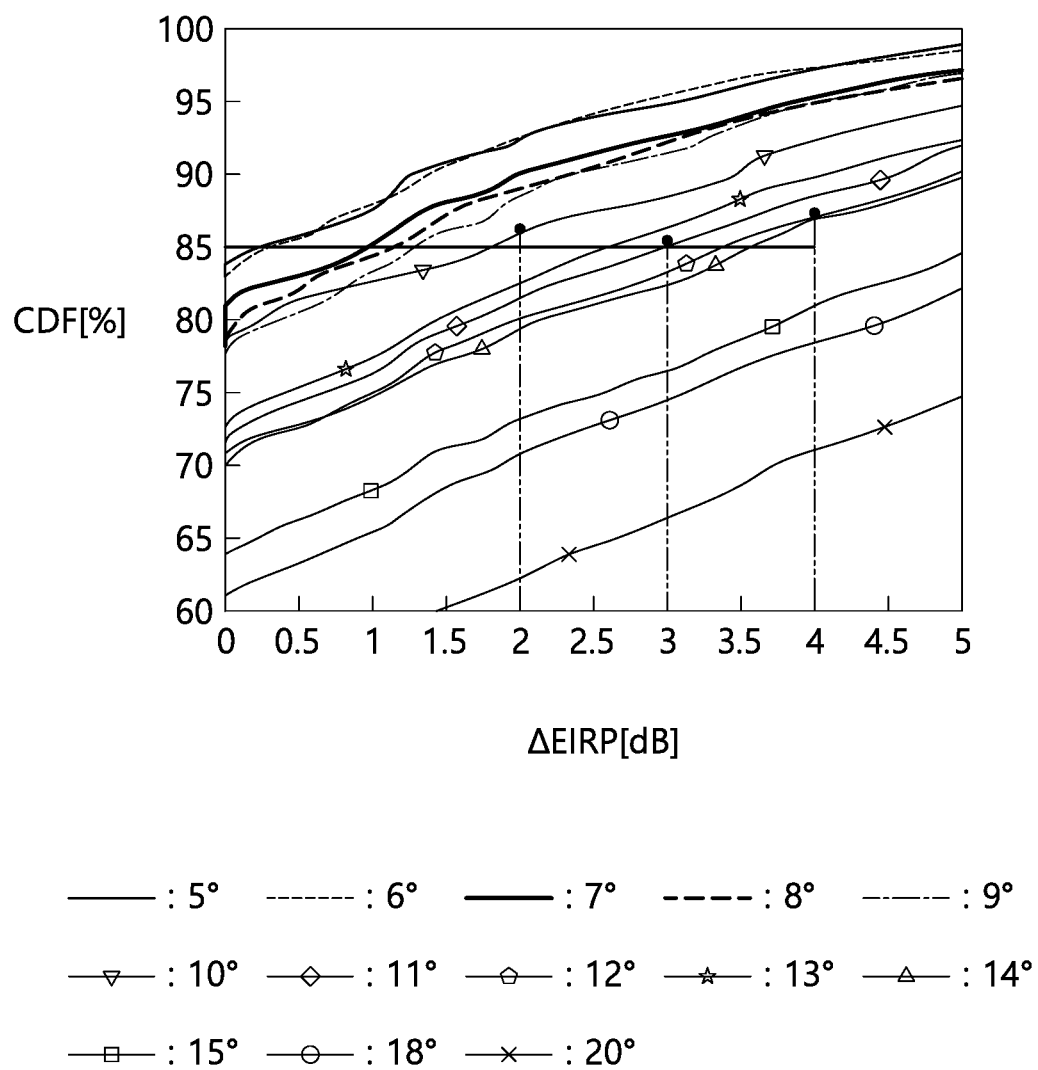

METHOD FOR SUPPORTING BEAM CORRESPONDENCE AND APPARATUS THEREOF

This application is a continuation application of U.S. patent application Ser. No. 16/789,055, filed on Feb. 12, 2020, which claims the benefit of Korean Patent Applications No. 10-2019-0018175, filed on Feb. 15, 2019 and No. 10-2019-0037440, filed Mar. 29, 2019, the contents of which are all hereby incorporated by reference herein in their entirety.

TECHNICAL FIELD

The present disclosure relates to mobile communication.

BACKGROUND

With the success in the Evolved Universal Terrestrial Radio Access Network (E-UTRAN) for 4th generation mobile communication, i.e., long term evolution (LTE)/LTE-Advanced(LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

Beam correspondence is an ability of a user equipment (UE) to select a suitable beam for uplink (UL) transmission based on downlink (DL) measurements.

However, it is unapparent how much accuracy a requirement of the beam correspondence requires in order to determine the UE capable of the beam correspondence.

SUMMARY

Accordingly, a disclosure of the specification has been made in an effort to solve the aforementioned problem.

In accordance with an embodiment of the present disclosure, a disclosure of this specification provides a method for supporting beam correspondence. The method may be performed by a user equipment (UE) and comprise: transmitting UE capability information to a base station. The UE capability information may include first information related a capability of supporting beam correspondence. The beam correspondence may be determined based on at least a beam correspondence tolerance requirement. The beam correspondence tolerance requirement may include a delta effective isotropic radiated power (EIRP) of 3 dB.

In accordance with an embodiment of the present disclosure, a disclosure of this specification provides an apparatus operable for a user equipment (UE) to support beam correspondence. The apparatus may comprise: at least one processor; and at least one computer memory operably connectable to the at least one processor and storing instructions that, when executed by the at least one processor, perform operations comprising: transmitting UE capability information to a base station. The UE capability information may include first information related a capability of supporting beam correspondence. The beam correspondence may be determined based on at least a beam correspondence tolerance requirement. The beam correspondence tolerance requirement may include a delta effective isotropic radiated power (EIRP) of 3 dB.

In accordance with an embodiment of the present disclosure, a disclosure of this specification provides a user equipment (UE) to support beam correspondence. The apparatus may comprise: a transceiver; at least one processor operably connectable to the transceiver; and at least one computer memory operably connectable to the at least one processor and storing instructions that, when executed by the at least one processor, perform operations comprising: transmitting UE capability information to a base station. The UE capability information may include first information related a capability of supporting beam correspondence. The beam correspondence may be determined based on at least a beam correspondence tolerance requirement. The beam correspondence tolerance requirement may include a delta effective isotropic radiated power (EIRP) of 3 dB.

According to a disclosure of the present disclosure, the above problem of the related art is solved.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 3 shows an example of subframe type in NR.

FIG. 9 shows an example of calculating Delta EIRP level assuming x degree tilted beam selected case.

FIG. 10b shows the CDF curve which zooms in FIG. 10a.

DETAILED DESCRIPTION OF THE EMBODIMENTS

Figure 1:
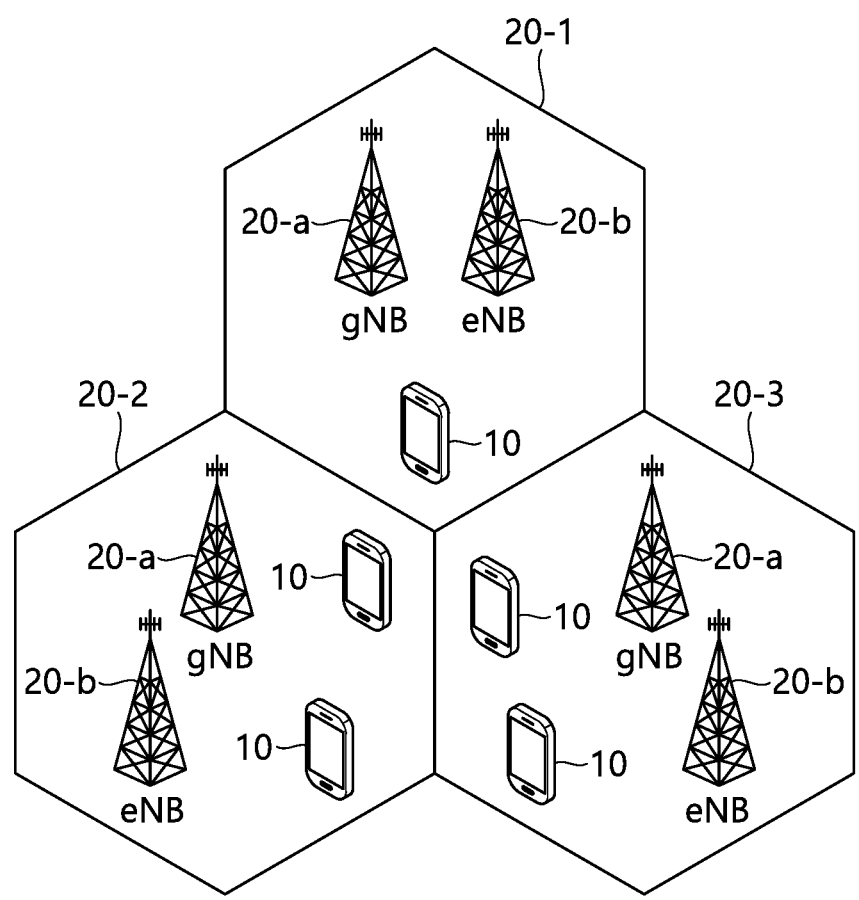
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Although the present disclosure has been described based on a Universal Mobile Telecommunication System (UMTS), an Evolved Packet Core (EPC), and a next generation (also known as 5th generation or 5G) mobile communication network, the present disclosure will be limited only to the aforementioned communication systems and may, therefore, be applied to all communication system and methods to which the technical scope and spirit of the present disclosure can be applied.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be an example of a wireless communication device such as stationary or mobile. Also, UE may be denoted by other terms such as device, wireless device, terminal, MS (mobile station), UT (user terminal), SS (subscriber station), MT (mobile terminal) and etc.

<Next-Generation Mobile Communication Network>

The following description of this specification may be applied to a next-generation (also known as 5th generation or 5G) mobile communication network.

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

FIG. 1 Illustrates a Wireless Communication System.

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 2A:
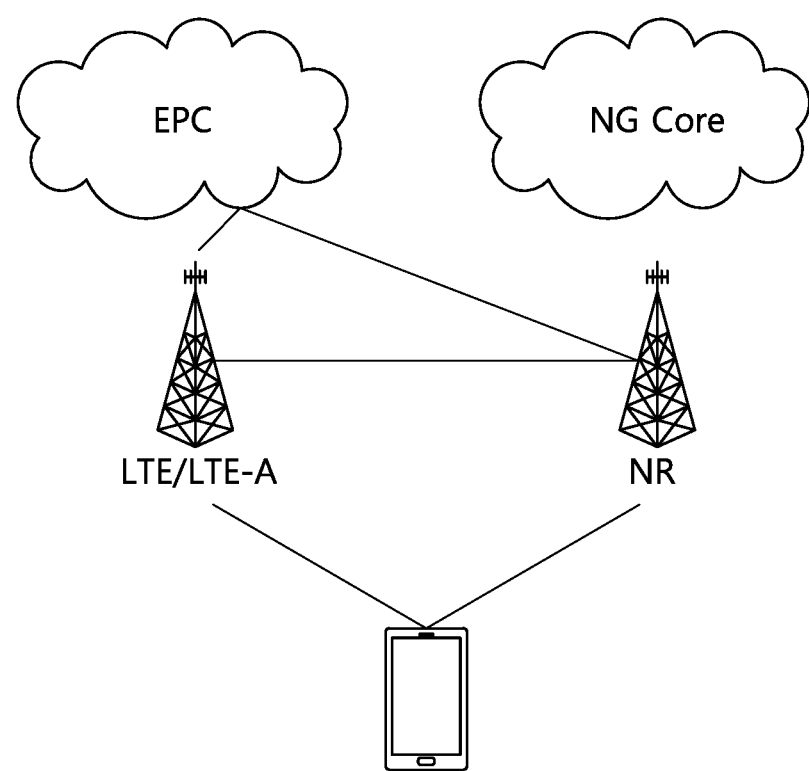
FIGS. 2a to 2c are exemplary diagrams illustrating exemplary architectures for services of the next generation mobile communication.
Figure 2B:
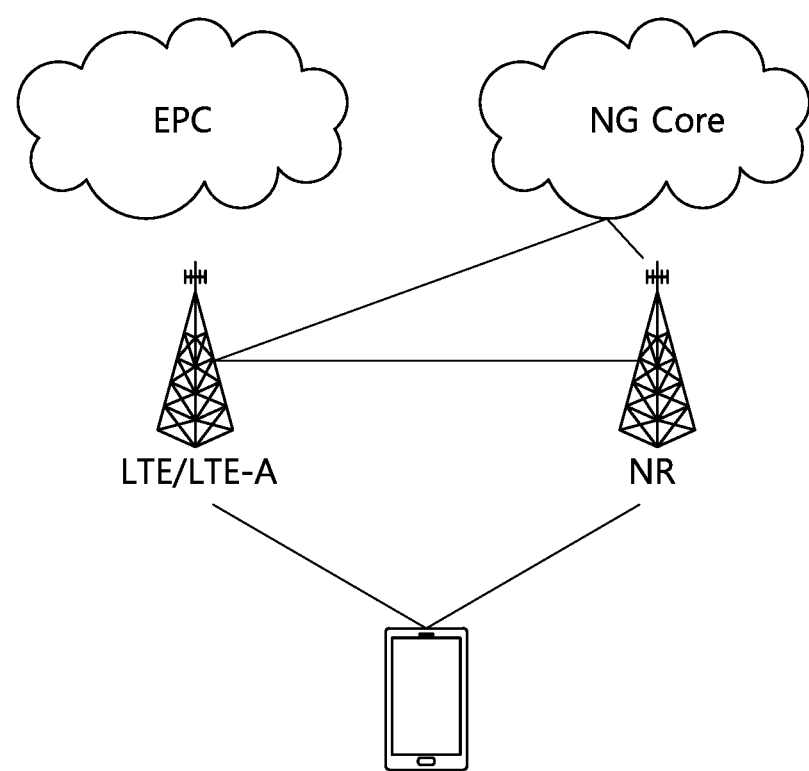
Figure 2C:
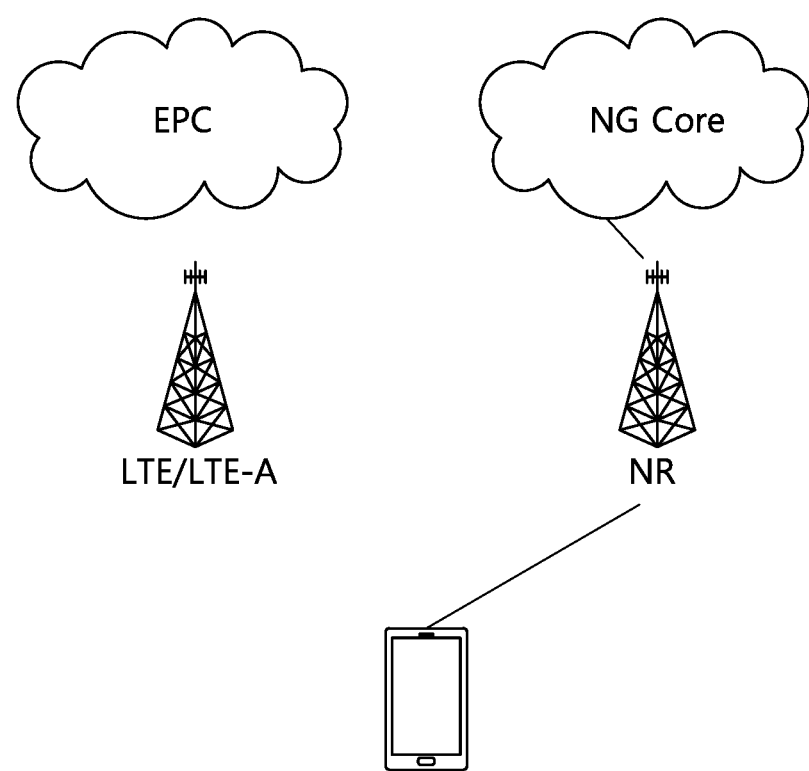

FIGS. 2a to 2c are Exemplary Diagrams Illustrating Exemplary Architectures for Services of the Next Generation Mobile Communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations.

For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, 1-R1 may refer to a "sub-6-GHz range", FR2 may refer to an "above-6-GHz range" and may be referred to as a millimeter wave (mmWave).

TABLE 1

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 2. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

<Operating Band in NR>

An operating band in NR is as follows.

Table 3 shows examples of operating bands on FRE Operating bands shown in Table 3 is a reframing operating band that is transitioned from an operating band of LTE/LTE-A. This operating band may be referred to as FR1 operating band.

TABLE 3

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 4 shows examples of operating bands on FR2. The following table shows operating bands defined on a high frequency. This operating band is referred to as FR2 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

Meanwhile, when the operating band shown in the above table is used, a channel bandwidth is used as shown in the following table.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

FIG. 3 Shows an Example of Subframe Type in NR.

Figure 4:
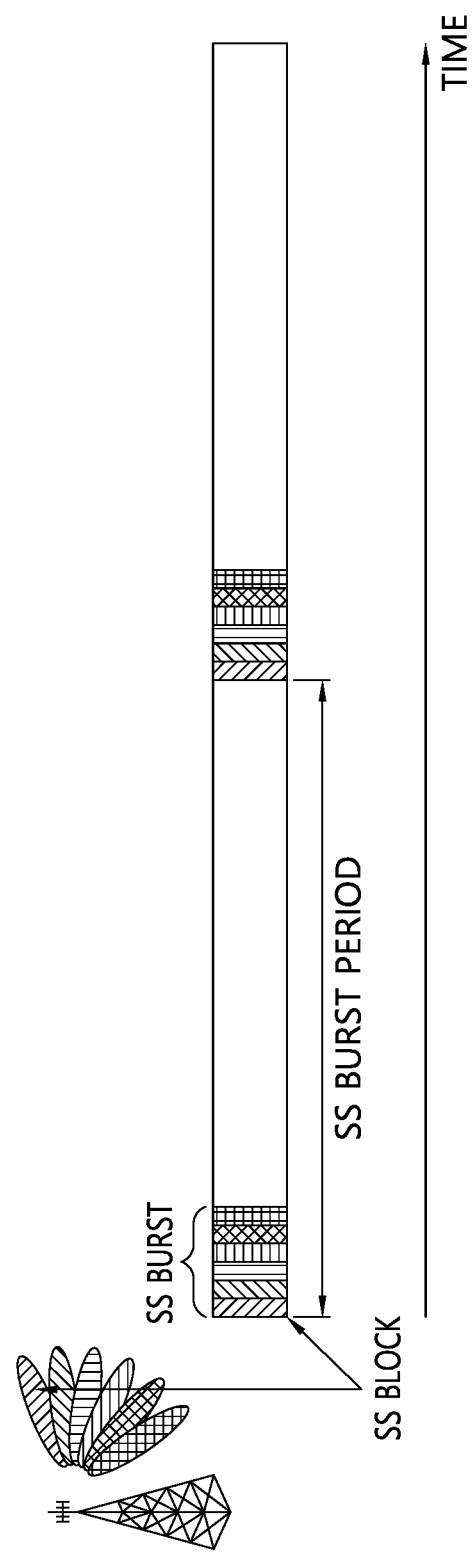
FIG. 4 is an exemplary diagram illustrating an example of an SS block in NR.
Figure 5:
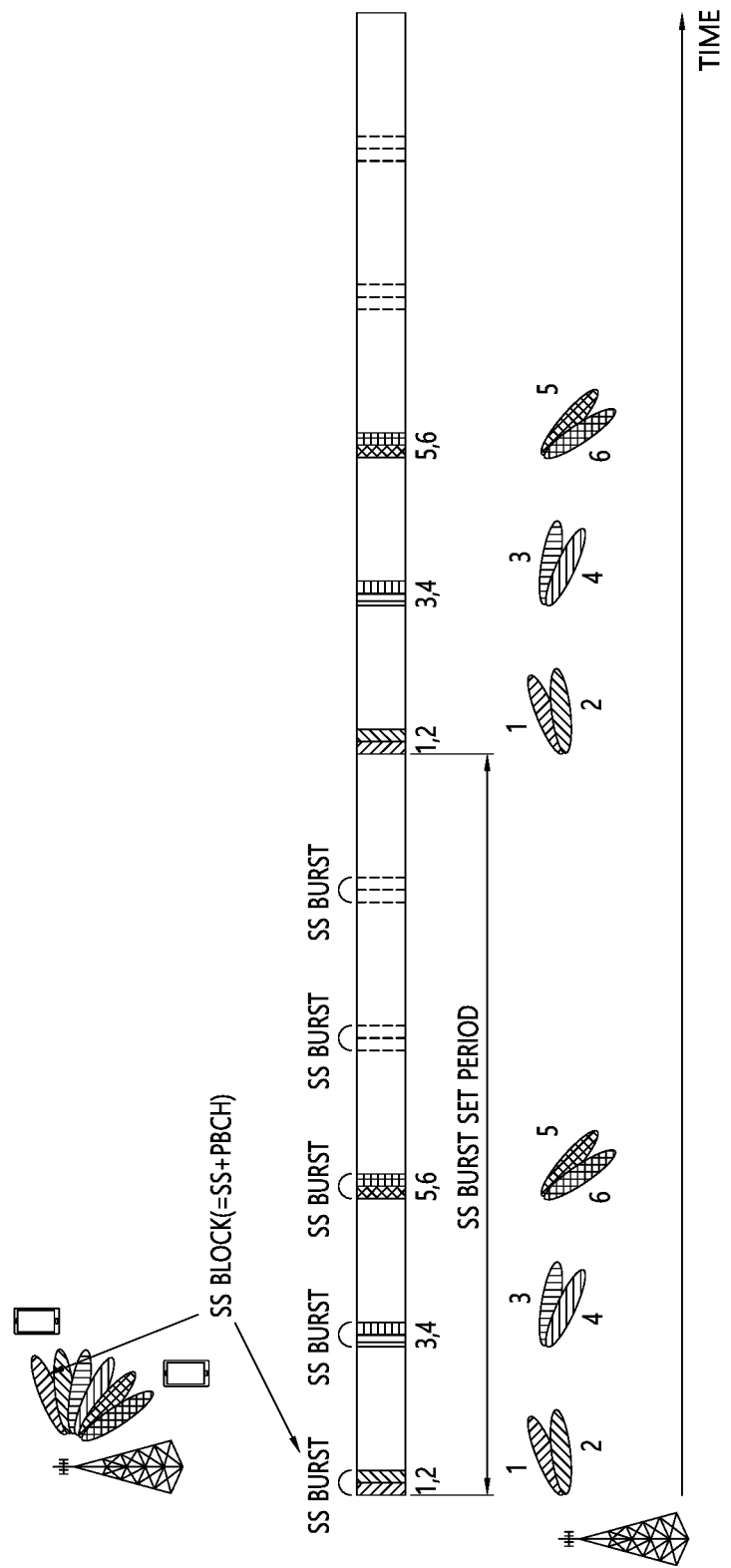
FIG. 5 is an exemplary diagram illustrating an example of beam sweeping in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 7

| M | $\Delta f = 2^\mu \cdot 15$ [kHz] | CP |
|---|---|---|
| 0 | 15 | Normal |
| 1 | 30 | Normal |

TABLE 7-continued

| M | $\Delta f = 2^\mu \cdot 15$ [kHz] | CP |
|---|---|---|
| 2 | 60 | Normal, Extended |
| 3 | 120 | Normal |
| 4 | 240 | Normal |

In the case of a normal CP, when an index of a numerology is expressed by μ, the number of OLDM symbols per slot $N^{slot}_{symb}$, the number of slots per frame Nframe,μslot, and the number of slots per subframe Nsubframe,μslot are expressed as shown in the following table.

TABLE 8

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot $N^{slot}_{symb}$, the number of slots per frame Nframe,μslot, and the number of slots per subframe Nsubframe,μslot are expressed as shown in the following table.

TABLE 9

| M | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 10

| Format | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |

TABLE 10-continued

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | X | X | U | U |
| 32 | D | D | D | D | D | D | D | D | D | D | X | U | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | D | X | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | X | X | U | U | U | D | X | X | U | U | U | U | U |
| 59 | D | X | X | U | U | U | D | X | X | U | U | U | U | U |
| 60 | D | X | X | X | X | U | D | X | X | X | X | X | U | U |
| 61 | D | D | X | X | X | X | U | D | D | X | X | X | X | U |

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

FIG. 4 is an Exemplary Diagram Illustrating an Example of an SS Block in NR.

Referring to FIG. 4, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 5.

FIG. 5 is an Exemplary Diagram Illustrating an Example of Beam Sweeping in NR.

The base station transmits each SS block in the SS burst with beam sweeping over time. At this time, the SS blocks in the SS burst set are transmitted in order to support UEs existing in different directions. In FIG. 5, the SS burst set includes SS blocks 1 to 6, and each SS burst includes two SS blocks.

<Disclosure of this Specification>

The disclosure of this specification will describe operations of entities within a communication system, such as a UE (as an example of wireless communication device), a base station including a PCell and/or a SCell, etc.

Figure 6:
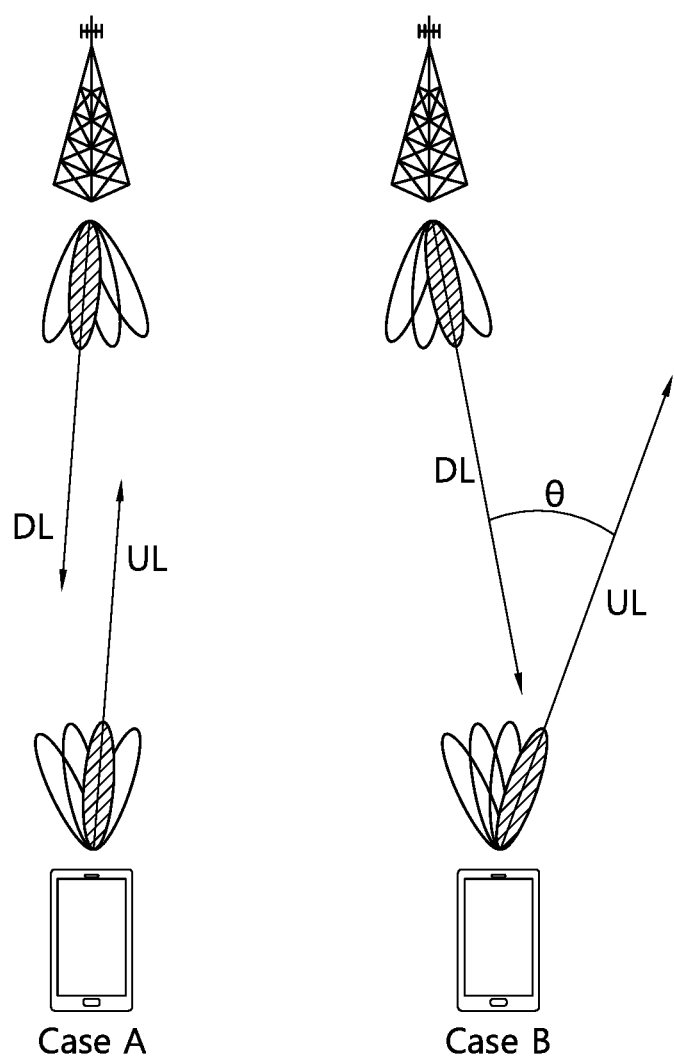
FIG. 6 shows three cases for explaining a beam correspondence.

FIG. 6 Shows Three Cases for Explaining a Beam Correspondence.

In FIG. 6, a case A shows an example that an uplink transmission beam of the UE match a downlink transmission beam of the BS. In this case, the UE may successfully receive and decode a downlink signal or channel from the BS and also the BS may successfully receive and decode an uplink signal or channel from the UE.

But, a case B shows an example that the uplink transmission beam of the UE does not match the downlink transmission beam of the BS. In this case, the UE cannot successfully receive and decode the downlink signal or channel from the BS and also the BS cannot successfully receive and decode the uplink signal or channel from the UE.

Beam correspondence is an ability of the UE to select a suitable beam for UL transmission based on DL measurements. The beam correspondence requirement is satisfied assuming the presence of both SSB and CSI-RS signals and a quasi colocation (QCL) is maintained between SSB and CSI-RS.

If the UE can meet the requirement for the beam correspondence, the UE is determined as UE capable of the beam correspondence.

In the case A, the requirement for the beam correspondence may be fulfilled. But, in the case B, the requirement for the beam correspondence cannot be fulfilled.

The beam correspondence requirement for UE (e.g., power class 3 UE) includes three components:

Requirement 1 (Req 1): UE minimum peak effective isotropic radiated power (EIRP)

Requirement 2 (Req 2): UE spherical coverage

Requirement 3 (Req 3): Beam correspondence tolerance

Figure 7:
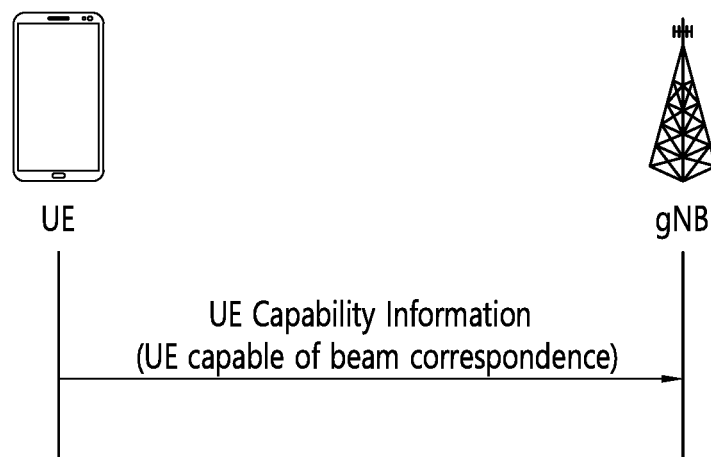
FIG. 7 shows a signal flow for transmitting UE capability information.

The beam correspondence requirement is fulfilled if the UE satisfies one of the following conditions, depending on the UE's beam correspondence capability:

FIG. 7 Shows a Signal Flow for Transmitting UE Capability Information.

Referring to FIG. 7, the UE transmit UE capability information to the gNB. The UE capability information may include information or indication representing whether the UE is a UE capable of the beam correspondence or not.

If the information is set to bit 1, the UE can meet the minimum peak EIRP requirement and spherical coverage requirement with its autonomously chosen UL beams and without uplink beam sweeping. Such a UE is considered to have met the beam correspondence tolerance requirement.

Meanwhile, a UE may be enhanced to perform an uplink (UL) beam sweeping. That is, the UE may be enhanced to change a direction of the uplink transmission beam toward a direction of the downlink transmission beam of the BS.

If the information is set to bit 0, the UE can meet the minimum peak EIRP requirement and spherical coverage requirement with uplink beam sweeping. Such a UE shall meet the beam correspondence tolerance requirement and shall support uplink beam management. So, such UE may be also called as a UE capable of beam correspondence (BC) (abbreviated to BC capable UE).

However, it is unapparent how much accuracy the requirement of the beam correspondence requires in order to determine the UE capable of the beam correspondence. Or how much tolerance to the requirement of the beam correspondence is allowed to determine the UE capable of the beam correspondence.

Figure 8:
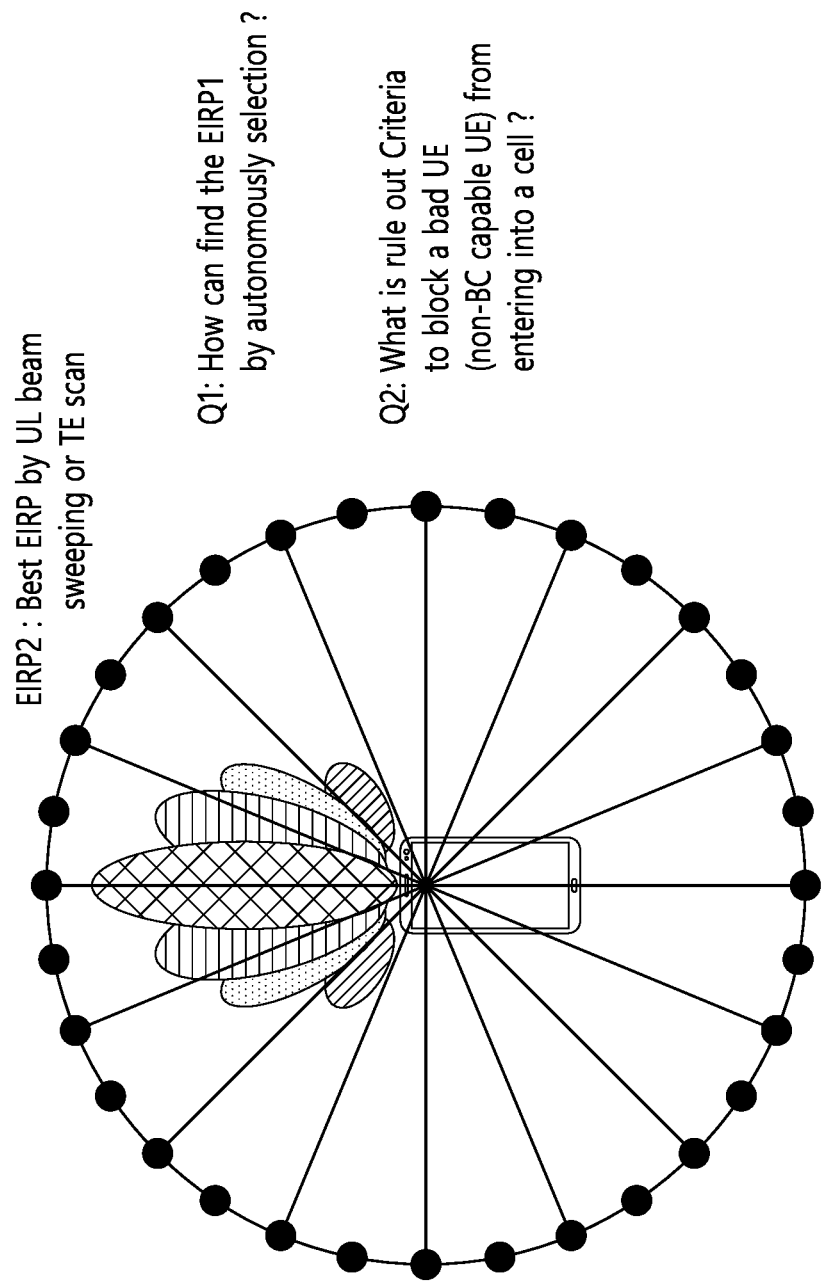
FIG. 8 shows an example of finding best EIRP level by UL beam sweeping or scan.

FIG. 8 Shows an Example of Finding Best EIRP Level by UL Beam Sweeping or Scan.

Referring to FIG. 8, it is unclear how can find EIRP 1 by UE autonomously selection and which is the criteria to block bad UE (non-BC capable UE using UL beam sweeping) from entering into a cell.

To derive the delta EIRP between EIRP 2 and EIRP 1, it is needed to decide how can find the EIRP 1 by autonomously UE selection.

Also, to measure the EIRP 1 level, it is needed to consensus the bad UE rule-out criteria because all NR UE should be support beam correspondence.

So, it is needed to decide rule-out criteria, then Q1 and Q2 shown in FIG. 8 are naturally solved. And, it is needed to measure the delta EIRP level between EIRP 1 and EIRP 2 level.

Therefore, two questions in FIG. 8 are answered as follows:

Q1: To derive delta EIRP level, how can RAN4 find the EIRP 1 by autonomously selection?

Ans1: First of all, it is needed define rule out criteria for bad UE, then find the EIRP 1 level only use the good UE (BC capable UE w/ UL beam sweeping)

Q2: what is rule out criteria to block a bad UE (non-BC capable UE) from entering into a cell?

Ans 2: it is needed decide [y]dB delta EIRP levels based on delta EIRP CDF curves according to beam inaccuracy. Based on the CDF curve, the rule out criteria for bad UE may be defined.

Accordingly, the present disclosure provides solutions or suggestions for determining UE partially capable of BC (abbreviated to partial BC capable UE).

In more detail, the present disclosure provides values of x (represented as % percentile) and delta y (represented as dB) for determining the beam correspondence (BC) capable UE. The values of x and y may be obtained by omnidirectional-cumulative distribution function (CDF) based on a delta value EIRP value between EIRP 1 and EIRP 2. Here, the delta EIRP value=EIRP 1–EIRP 2.

I. Clarification on Partial BC Capable UE

It is needed to define additional Req 3 (i.e., beam correspondence tolerance) when the UE meeting Req 1 (i.e., the Minimum peak EIRP requirement) and Req 2 (i.e., Spherical coverage requirement) with the uplink beam sweeping as follow:

For each of the test points in the grid, two EIRP should be calculated.

EIRP 1 is calculated based on the beam the UE chooses autonomously (corresponding beam) to transmit in the direction of the incoming DL signal.

No uplink beam sweeping is assumed

EIRP 2 is the best EIRP (beam yielding highest EIRP in a given direction) which is based on UL beam sweeping or TE scan.

It is needed to specify the procedure how the best EIRP is defined and derived.

Delta EIRP=EIRP2–EIRP1

The test grid points where beam correspondence is verified are the grid points where the UE meets the spherical coverage requirements.

I-1. Discussion on the Criteria to Rule Out the Bad UE

To find the rule-out criteria, it may assumed that UE autonomously find the best beam ID (e.g. #B2) in FIG. 9 which is tilted x degree from the best beam direction.

FIG. 9 Shows an Example of Calculating Delta EIRP Level Assuming x Degree Tilted Beam Selected Case.

Then calculate the delta EIRP between EIRP 2 and EIRP 1, then draw CDF curve for all measurements grid. And repeat this procedure according to x degree.

The reference CDF curve is x=5°, the degradation from the reference CDF curve may be compared with the others. Then the candidate boundary may be found to satisfy the allowed delta dB such as [2 dB] as shown in FIG. 10a and FIG. 10b.

It means to allow 14 degree beam tilted autonomous selected UE to satisfy the partial BC capable UE with UL beam sweeping.

Figure 10A:
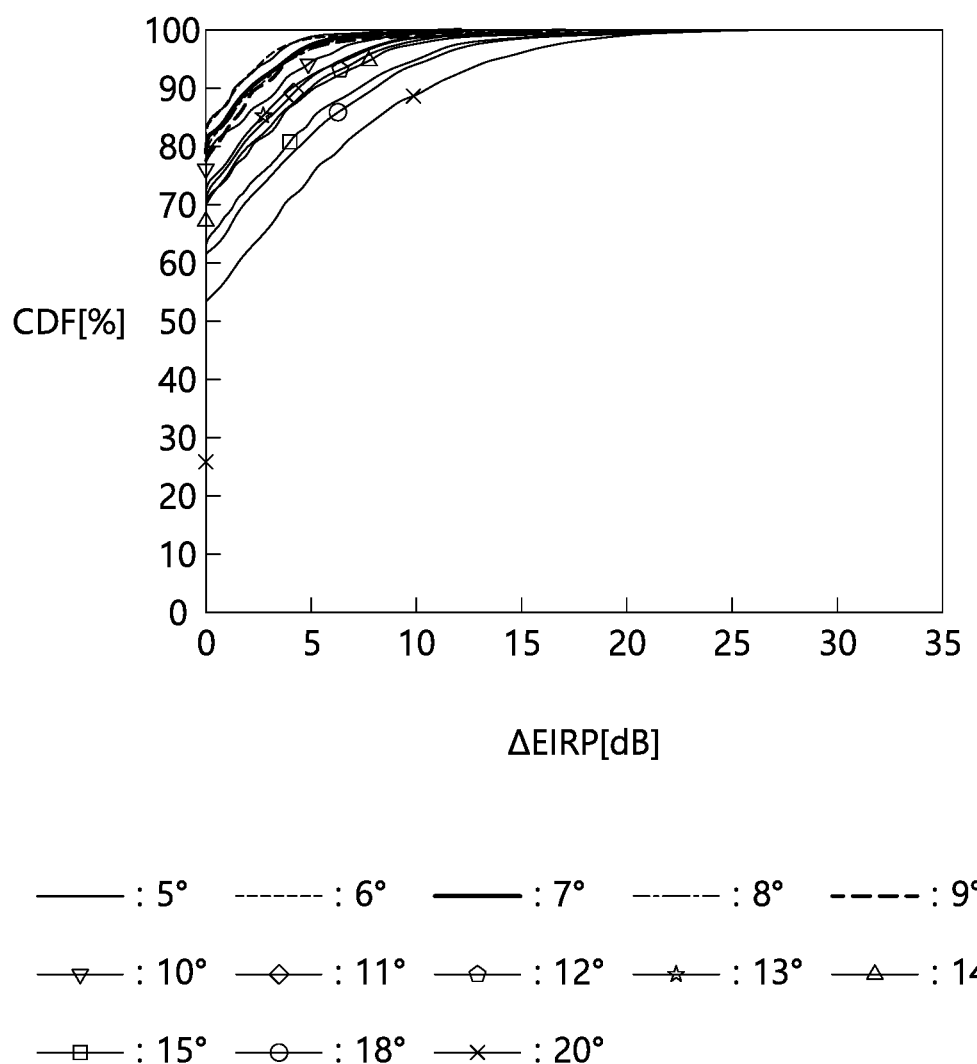
FIG. 10a shows CDF curve for decision of criteria for rule out of bad UE (non-BC capable UE)

So, based on the decided criteria for rule-out the bad UE, the Req 3 may be defined using the CDF curve like as FIG. 10a and FIG. 10b.

In FIG. 10b, the 2 dB delta EIRP allow the 10 degree beam inaccuracy at 85% CDF point when 7.5 degree EIRP measurement grid is considered.

Also 3 dB delta EIRP allow 11 degree beam inaccuracy and at same CDF point. The difference of beam inaccuracy is just 1 degree difference between 2 dB delta EIRP and 3 dB delta EIRP.

To derive the rule-out criteria and define the Req 3 (i.e., Beam correspondence tolerance) for partial beam correspondence UE, the present disclosure provides simulation results.

II. Simulation Assumption for Partial BC Capable UE (for Beam Correspondence Tolerance)

In this section, we propose the simulation assumption and test methodology for the delta EIRP based on reasonable rule out criteria for BC capable UE when UE perform beam sweeping by network request.

Proposed simulation assumption

Keep the EIRP measurement grid with 7.5 degree

Consider same UE RF test parameters to derive Peak/Spherical EIRP requirements

To draw the CDF curve, the EIRP 1 is founded in EIRP 2 beam direction

For EIRP 2, select EIPR2 measurement point meet the spherical EIRP requirement

Assume the Beam inaccuracy [5,6,7,8, . . . 20] with 1 degree step

Figure 11:
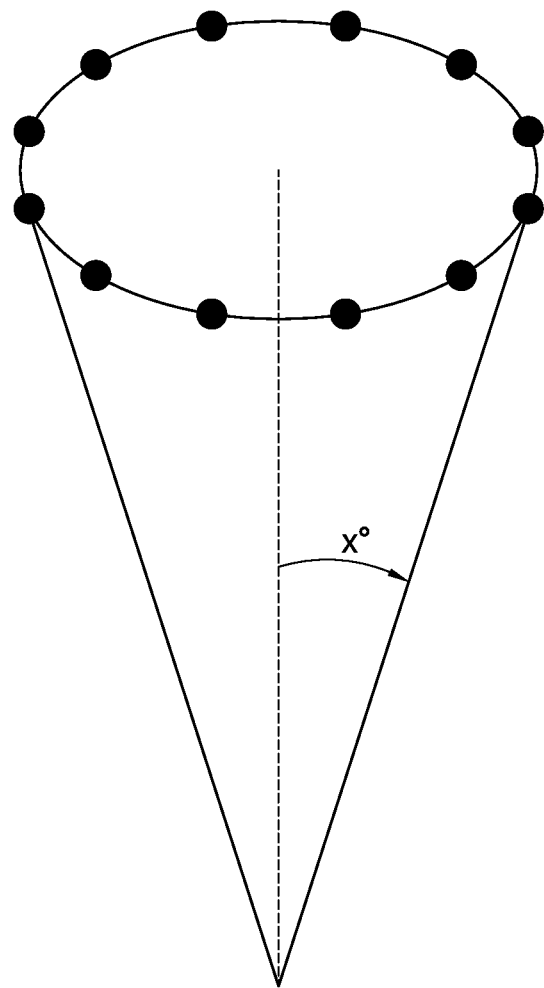
FIG. 11 shows x degree inaccuracy beam selection in 3D spherical area

For EIRP 1, find EIRP 1 measurement point in EIRP 2 beam direction as shown in FIG. 11.

A delta EIRP statistic may be found based on CDF curves.

Based on simulation results, it is proposed as follows:

Proposal 1: The delta EIRP CDF curve is proposed based on simulation assumption and test methodology.

Proposal 2: From the simulation results, it is proposed to recommend the [2-3] dB delta EIRP at [80-85] % CDF curve.

Proposal 2-1: From the simulation results, it is proposed to recommend the [2] dB delta EIRP at [80] % CDF curve or [3] dB delta EIRP at [85]% CDF curve.

II-2. Revised Simulation Assumption for Partial BC Capable UE (Req. 3)

In this section, it is proposed the simulation assumption and test methodology for the delta EIRP based on reasonable rule out criteria for band UE.

Test point is top 50% EIRP 2 points for Power Class3 UE at FR2.

Basic principle: Test procedure and test point will be decided as package to reduce the OTA test time.

How to deal with UEs with capability signalling 2-20=0 that can pass Req 1 (i.e., the Minimum peak EIRP requirement) & Req 2 (i.e., UE spherical coverage) without UL sweeping The beam correspondence capability is signaled by UE to gNB as follow UE that fulfills the beam correspondence requirement without the uplink beam sweeping shall set the bit to 2-20=1

UE that fulfills the beam correspondence requirement with the uplink beam sweeping shall set the bit to 2-20=0, then the UE feature 2-30 (Uplink beam sweeping capability) shall be set to 2-30=1

Test on Req 3 (i.e., beam correspondence tolerance) always applies, i.e., do not confirm the setting of 2-20=0. Apply Req 3 (i.e., beam correspondence tolerance) based only on the declaration of 2-20=0 and 2-30=1.

DL high SNR is considered.

The same polarization combining option will be used for both EIRP 1 and EIRP 2.

EIRP CDF is derived based on data vector [maximum (V–V+V–H, H–V+H–H)] cross all testing points.

$$\text{Delta EIRP} = \text{EIRP2}[\max(V\text{–}V+V\text{–}H, H\text{–}V+H\text{–}H)] - \text{EIRP1}[\max(V\text{–}V+V\text{–}H, H\text{–}V+H\text{–}H)]$$

Baseline simulation assumption for checking point of value X: 80% 85%, 90% 95% and 100%. In addition, it needs to check other point, e.g., 60%

BC capability and requirements shall be per-band basis.

Simulation assumption to apply error terms per element antenna is listed in below table.

TABLE 11

| UE RF parameters | Unit | Value | Notes |
| --- | --- | --- | --- |
| Frequency Band | | n257/n258/ n260/n261 | Antenna performance can be different |
| Measurement grid | degree | 7.5° or 15° | Peak EIRP is 7.5 Spherical EIRP is 15 |
| # number of element antenna in an antenna module/set (# of panels, # of analog beam(k), etc.) | | 4 (2 panels, # total beam: 8, 16, 32) | Consider switched 2 panels. These parameters will be depend on UE implementation. Other vales are not precluded |
| Polarization | | 2 polarization | |
| Antenna location (front, back, top-side, left-side, right-side, bottom-side) | | Left/Right | Combination of the lists are not precluded. |
| Phase Error per Antenna element ($\delta_{pk}$) | Degree/ dB | $\delta_{pk} \sim N(0, \alpha^2)$ with $\alpha = [5\sim10]°$ | Other distributions are not precluded |
| Amplitude Error per Antenna element ($\delta_{ak}$) | | $\delta_{ak} \sim N(0, \alpha^2)$ with $\alpha = [0.5]$ dB | |
| Error in RSRP estimation ($D_k$) | dB | $\Delta k \sim N(0, [2]^2)$ | |
| Front cover (Plastic, Glass, Ceramic, Metal) | | Glass | This information is meaningful only if it's the same with the metal which covers antennas. |
| Back cover (Plastic, Glass, Ceramic, Metal) | | Glass | |
| Side cover/Frame (Plastic, Glass, Ceramic, Metal) | | Metal | |
| Display panel - Full (Y) or Partial (N) | Y/N | Y | |
| Bezel Margin | mm | 1.5 | Module can't be placed outer edge of UE to secure mechanical reliability |

Simulation assumption to apply error terms per beam is listed in below table.

TABLE 12

| UE RF parameters | Unit | Value | Notes |
| --- | --- | --- | --- |
| Frequency Band | | n257/n258/ n260/n261 | Antenna performance can be different |
| Measurement grid | degree | 7.5° or 15° | Peak EIRP is 7.5 Spherical EIRP is 15 |
| # number of element antenna in an antenna module/set (# of panels, # of analog beam(k), etc.) | | 4 (2 panels, # total beam: 8, 16, 32) | Consider switched 2 panels. These parameters will be depend on UE implementation. Other vales are not precluded |
| Polarization | | 2 polarization | |
| Antenna location (front, back, top-side, left-side, right-side, bottom-side) | | Left/Right | Combination of the lists are not precluded. |
| Phase Error per Antenna element ($\delta_{pk}$) | Degree/ dB | $\delta_{pk} \sim N(0, \alpha^2)$ with $\alpha = [10\sim45]°$ | Other distributions are not precluded |
| Amplitude Error per Antenna element ($\delta_{ak}$) | | $\delta_{ak} \sim N(0, \alpha^2)$ with $\alpha = [1\sim3]$ dB | |
| Error in RSRP estimation ($D_k$) | dB | $\Delta k \sim N(0, [2]^2)$ | |
| Front cover (Plastic, Glass, Ceramic, Metal) | | Glass | This information is meaningful only if it's the same with the metal which covers antennas. |
| Back cover (Plastic, Glass, Ceramic, Metal) | | Glass | |
| Side cover/Frame (Plastic, Glass, Ceramic, Metal) | | Metal | |
| Display panel - Full (Y) or Partial (N) | Y/N | Y | |
| Bezel Margin | mm | 1.5 | Module can't be placed outer edge of UE to secure mechanical reliability |

II-3. Revised Simulation Results

In order to model phase/amplitude error between Rx and Tx beam, following simulation parameter are used.

TABLE 13

| Parameter | Unit | Value |
| --- | --- | --- |
| # of Total Beam | | 4/8 |
| Beam pattern | | Realistic UE beam pattern on n257 |
| Phase Error per Beam ($\delta_{pk}$) | Degree | 5°/10°/15°/20° |
| Amplitude Error per Beam ($\delta_{ak}$) | dB | 1 dB/2 dB/3 dB |
| Error in RSRP estimation(Dk) | dB | 2 dB |

Figure 12A:
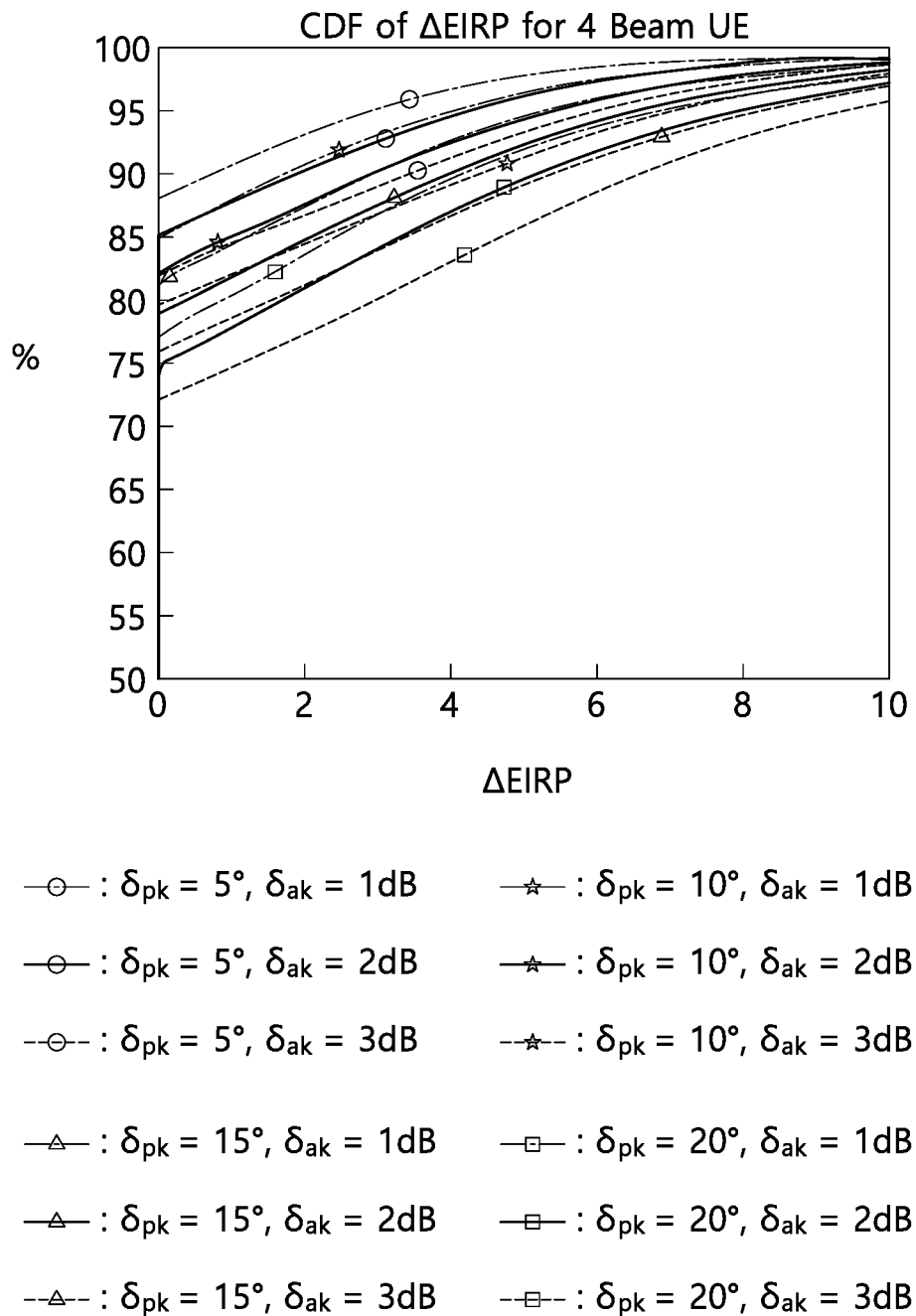
FIG. 12a shows simulation results for UE using 4 Beams and FIG. 12b shows simulation results for UE using 8 Beams
Figure 12B:
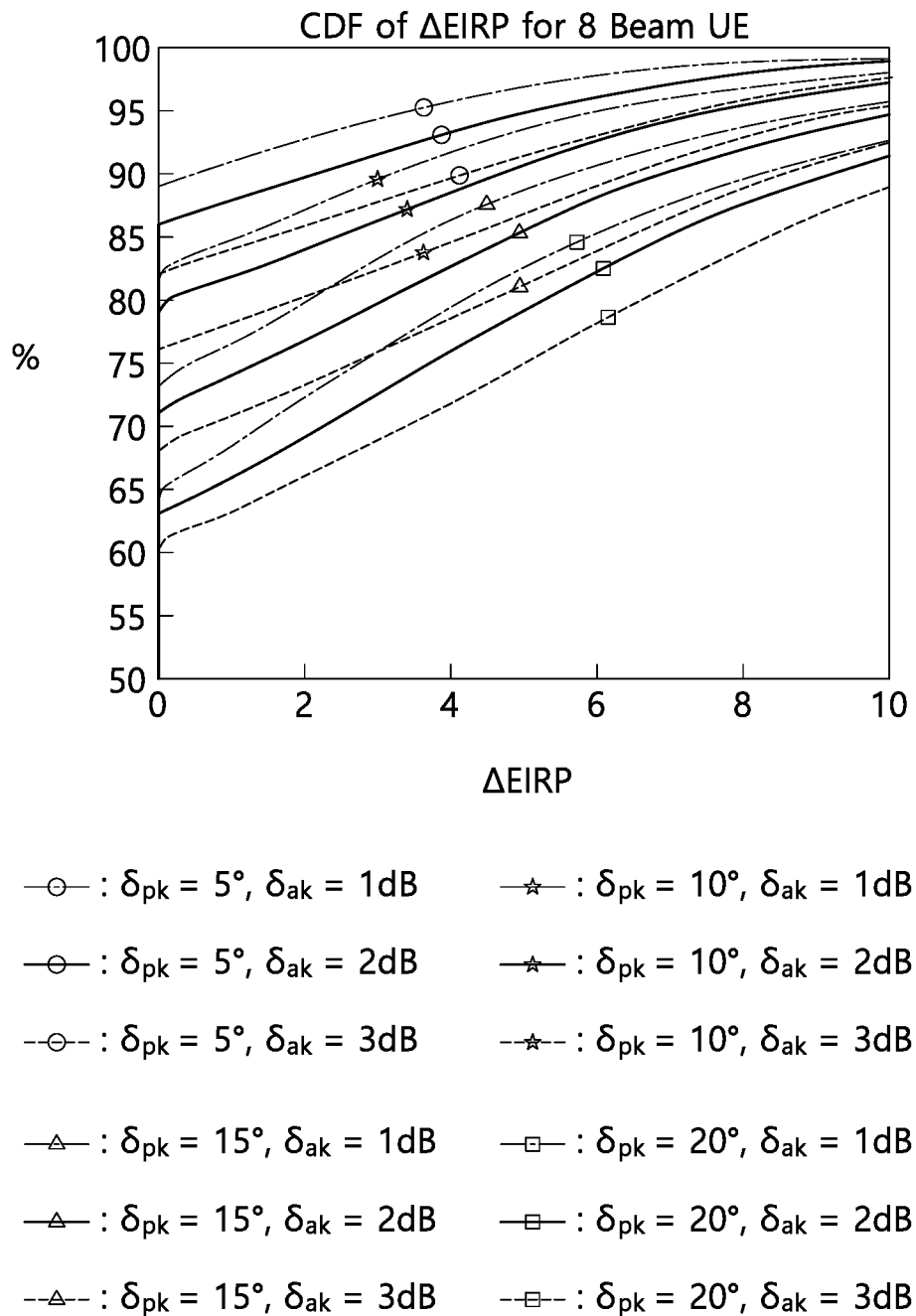

FIG. 12a Shows Simulation Results for UE Using 4 Beams and FIG. 12b Shows Simulation Results for UE Using 8 Beams Although simulation results are evaluated for given various combination for phase error and amplitude, it is noted that this value should be based on implementation aspect and RF calibration cost. In observation, 15° of phase error and 2 dB of amplitude error seems feasible as implement target with reasonable cost. Considering up to 15° of phase error and 2 dB of amplitude error, beam correspondence requirement should be 4 dB of ΔEIRP at 80%-tile point.

Proposal: Use 4 dB of ΔEIRP at 80%-tile point as beam correspondence tolerance requirement.

The present disclosure may be summarized as follows:

The UE may transmit UE capability information (UE feature 2-20) to a base station (gNB). The UE capability information may include first information related a capability of supporting beam correspondence. The beam correspondence may be determined based on at least a beam correspondence tolerance requirement. The beam correspondence tolerance requirement may include a delta effective isotropic radiated power (EIRP) of 3 dB.

The delta EIRP of 3 dB may be determined at 85% of a cumulative distribution function (CDF).

The beam correspondence may be determined further based on at least one of a UE minimum peak EIRP requirement and/or a UE spherical coverage requirement.

The first information related the capability of supporting the beam correspondence may be set to a bit 1, based on that the UE minimum peak EIRP requirement and UE minimum peak EIRP requirement are met.

The UE may determines that the beam correspondence tolerance requirement is met, based on that the UE minimum peak EIRP requirement and UE minimum peak EIRP requirement are met.

The first information related the capability of supporting the beam correspondence may be set to a bit 0, based on that the UE minimum peak EIRP requirement and UE minimum peak EIRP requirement are met with an uplink beam sweeping (UE feature 2-30).

The delta EIRP of 3 dB may be determined based on a first EIRP and a second EIRP.

The first EIRP may be calculated based on a beam the UE chooses autonomously.

The second EIRP may be a best EIRP based on an uplink beam sweeping.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 13:
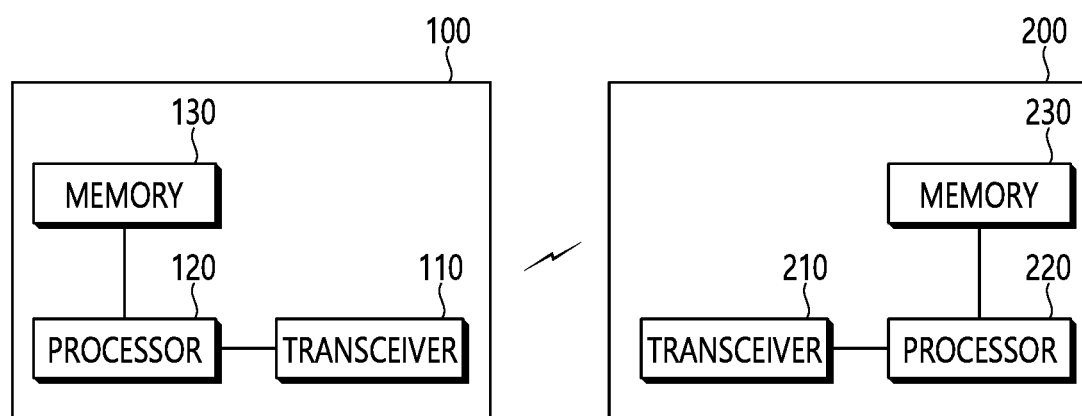
FIG. 13 is a block diagram illustrating a wireless device and a base station, by which the disclosure of this specification can be implemented.

FIG. 13 is a Block Diagram Illustrating a Wireless Device and a Base Station, by which the Disclosure of this Specification can be Implemented.

Referring to FIG. 13, a wireless device 100 and a base station 200 may implement the disclosure of this specification.

The wireless device 100 includes a processor 120, a memory 130, and a transceiver 110. Likewise, the base station 200 includes a processor 220, a memory 230, and a transceiver 210. The processors 120 and 220, the memories 130 and 230, and the transceivers 110 and 210 may be implemented as separate chips, or at least two or more blocks/functions may be implemented through one chip.

Each of the transceivers 110 and 210 includes a transmitter and a receiver. When a particular operation is performed, either or both of the transmitter and the receiver may operate. Each of the transceivers 110 and 210 may include one or more antennas for transmitting and/or receiving a radio signal. In addition, each of the transceivers 110 and 210 may include an amplifier configured for amplifying a Rx signal and/or a Tx signal, and a band pass filter for transmitting a signal to a particular frequency band.

Each of the processors 120 and 220 may implement functions, procedures, and/or methods proposed in this specification. Each of the processors 120 and 220 may include an encoder and a decoder. For example, each of the processors 120 and 230 may perform operations described above. Each of the processors 120 and 220 may include an application-specific integrated circuit (ASIC), a different chipset, a logic circuit, a data processing device, and/or a converter which converts a base band signal and a radio signal into each other.

Each of the memories 130 and 230 may include a Read-Only Memory (ROM), a Random Access Memory (RAM), a flash memory, a memory card, a storage medium, and/or any other storage device.

Figure 14:
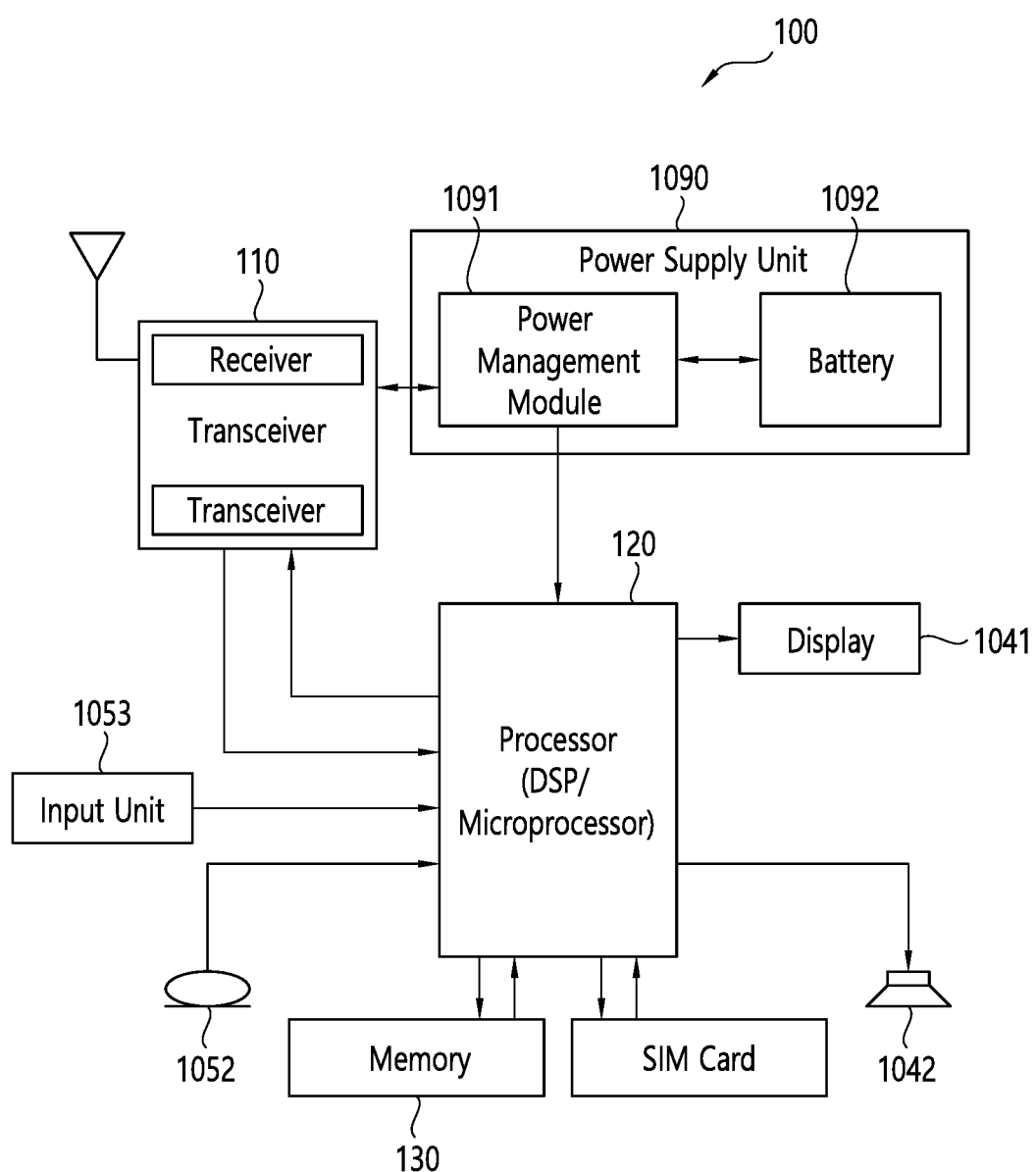
FIG. 14 is a block diagram showing a detail structure of the wireless device shown in FIG. 13.

FIG. 14 is a Block Diagram Showing a Detail Structure of the Wireless Device Shown in FIG. 13.

In particular, FIG. 14 shows an example of the wireless device of FIG. 13 in greater detail.

A wireless device includes a memory 130, a processor 120, a transceiver 110, a power management module 1091, a battery 1092, a display 1041, an input unit 1053, a speaker 1042, a microphone 1052, a subscriber identification module (SIM) card, and one or more antennas.

The processor 120 may be configured to implement the proposed functions, procedures, and/or methods described in the present specification. Layers of a radio interface protocol may be implemented in the processor 120. The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 120 and/or the transceiver 110. The battery 1092 supplies power to the power management module 1091. The display 1041 outputs a result processed by the processor 120. The input unit 1053 receives an input to be used by the processor 120. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 130 is operatively coupled to the processor 120, and stores a variety of information for operating the processor 120. The memory 130 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 130 and may be performed by the processor 120. The memory 130 may be implemented inside the processor 120. Alternatively, the memory 130 may be implemented outside the processor 120, and may be coupled to the processor 120 in a communicable manner by using various well-known means.

The transceiver 110 is operatively coupled to the processor 120, and transmits and/or receives a radio signal. The transceiver 110 includes a transmitter and a receiver. The transceiver 110 may include a baseband signal for processing a radio frequency signal. The transceiver controls one or more antennas to transmit and/or receive a radio signal. In order to initiate communication, the processor 120 transfers command information to the transceiver 110, for example, to transmit a radio signal constituting voice communication data. The antenna serves to transmit and receive a radio signal. When the radio signal is received, the transceiver 110 may transfer a signal to be processed by the processor 120, and may convert the signal into a baseband signal. The processed signal may be converted into audible or readable information which is output through the speaker 1042.

The speaker 1042 outputs a result related to a sound processed by the processor 120. The microphone 1052 receives a sound-related input to be used by the processor 120.

A user presses (or touches) a button of the input unit 1053 or drives voice (activates voice) by using the microphone 1052 to input command information such as a phone number or the like. The processor 120 receives the command information, and performs a proper function such as calling the phone number or the like. Operational data may be extracted from the SIM card or the memory 130. In addition, the processor 120 may display command information or operational information on the display 1041 for user's recognition and convenience.

Figure 15:
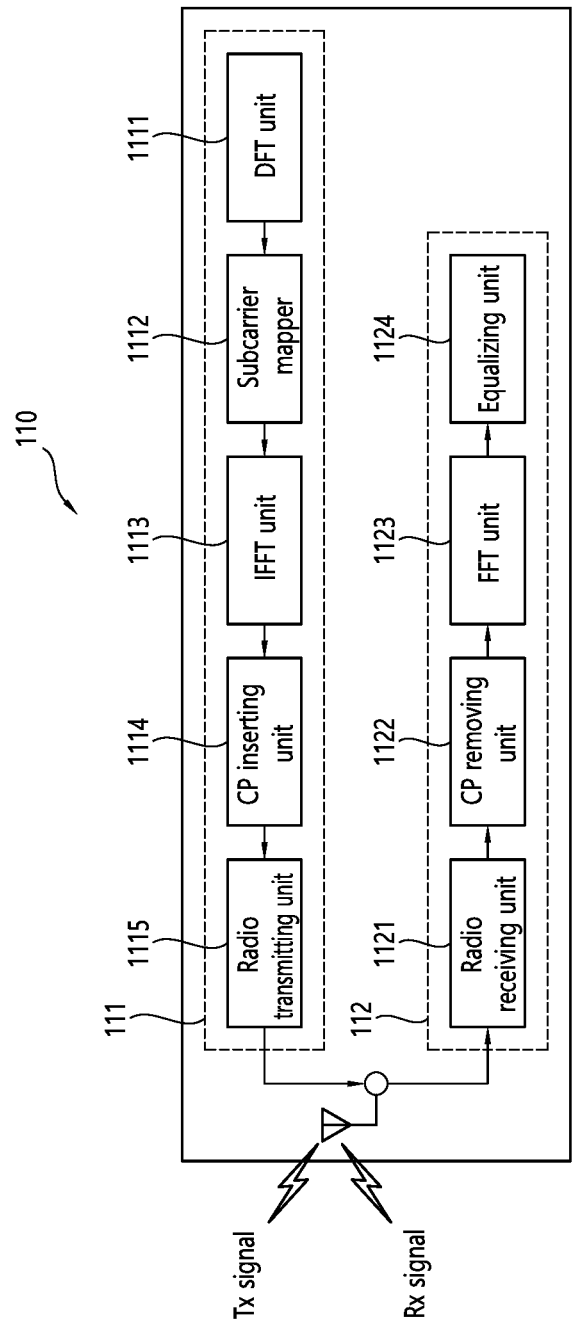
FIG. 15 is a detailed block diagram illustrating a transceiver of the wireless device shown in FIG. 13 and FIG. 14.

FIG. 15 is a Detailed Block Diagram Illustrating a Transceiver of the Wireless Device Shown in FIG. 13 and FIG. 14.

Referring to FIG. 15, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFNT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

Figure 16:
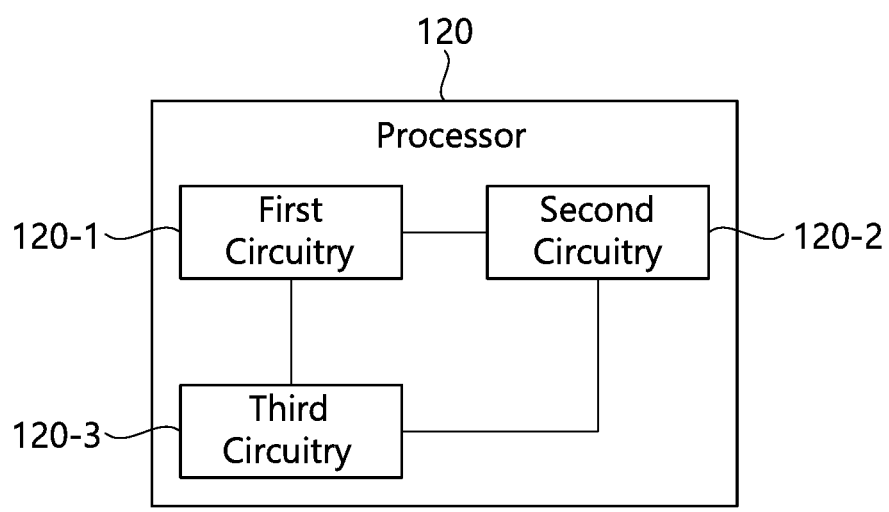
FIG. 16 illustrates a detailed block diagram illustrating a processor of the wireless device shown in FIG. 13 and FIG. 14.

FIG. 16 Illustrates a Detailed Block Diagram Illustrating a Processor of the Wireless Device Shown in FIG. 13 and FIG. 14.

Referring to FIG. 16, the processor 120 as illustrated in FIG. 13 and FIG. 14 may comprise a plurality of circuitries such as a first circuitry 120-1, a second circuitry 120-2 and a third circuitry 120-3.

The plurality of circuitries may be configured to implement the proposed functions, procedures, and/or methods described in the present specification.

The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 17:
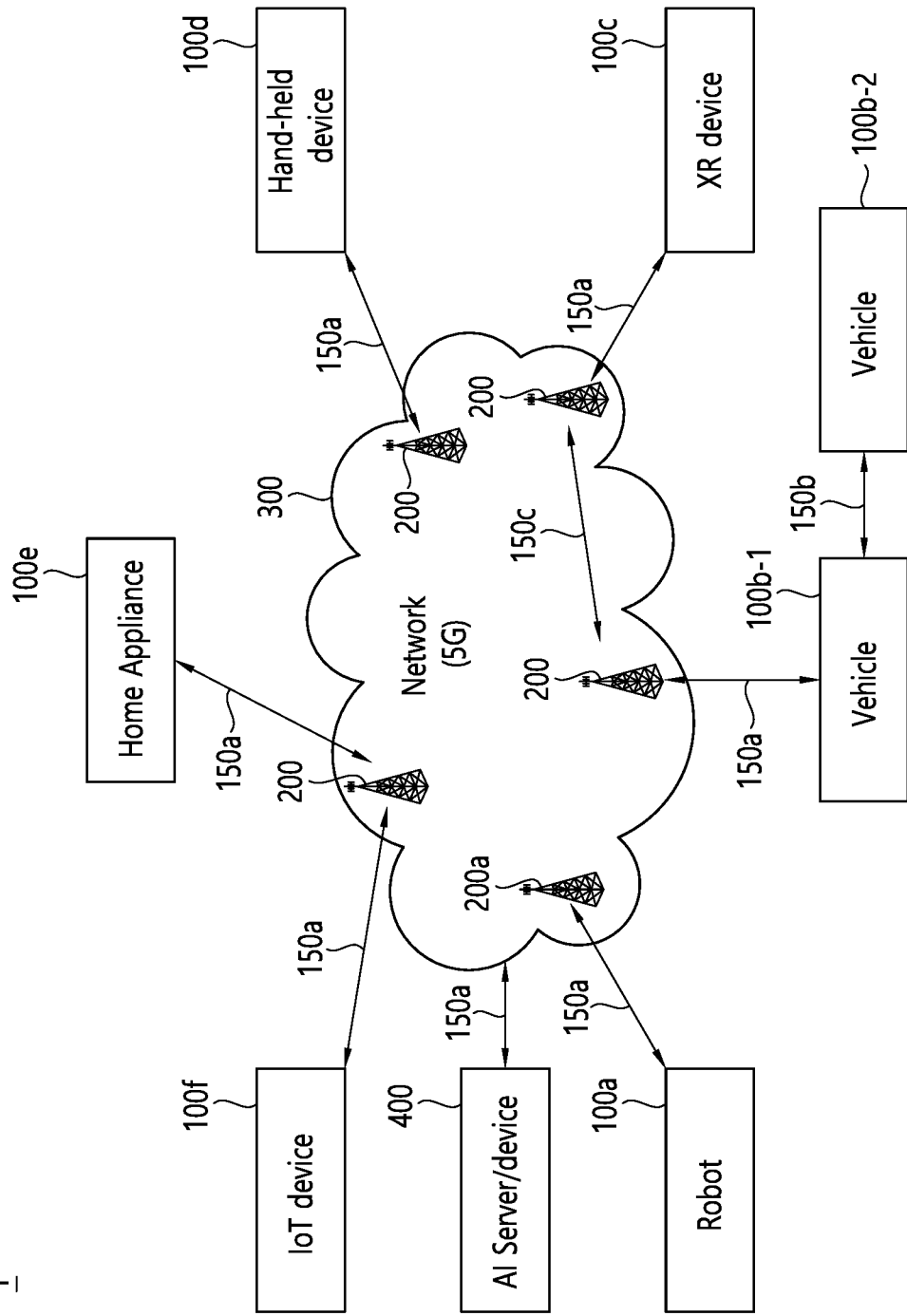
FIG. 17 illustrates a communication system that can be applied to the present specification.

FIG. 17 Illustrates a Communication System that can be Applied to the Present Specification.

Referring to FIG. 17, a communication system applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, at least some of various configuration information setting processes for transmitting/receiving a wireless signal, various signal processing processes (e.g., channel encoding/decoding, modulation/demodulation, resource mapping/demapping, etc.) may be performed.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for supporting beam correspondence, the method performed by a user equipment (UE) and comprising:
   determining beam correspondence based on at least a beam correspondence tolerance requirement,
   wherein the beam correspondence tolerance requirement includes a delta effective isotropic radiated power (EIRP) of 3 dB,
   wherein the delta EIRP of 3 dB is determined based on a first EIRP and a second EIRP,
   wherein the first EIRP is based on a beam the UE chooses, and
   wherein the second EIRP is the highest EIRP based on an uplink beam sweeping;
   transmitting UE capability information to a base station,
   wherein the UE capability information includes first information related to a capability of supporting beam correspondence, based on the determined beam correspondence.

2. The method of claim 1, wherein the delta EIRP of 3 dB is determined at 85% of a cumulative distribution function (CDF).

3. The method of claim 1, wherein the beam correspondence is further determined based on at least one of a UE minimum peak EIRP requirement or a UE spherical coverage requirement.

4. The method of claim 3, wherein the first information related to the capability of supporting the beam correspondence is set to a bit 1, based on the UE minimum peak EIRP requirement and UE minimum peak EIRP requirement being met.

5. The method of claim 4, further comprising:
   determining that the beam correspondence tolerance requirement is met, based on the UE minimum peak EIRP requirement and UE minimum peak EIRP requirement being met.

6. The method of claim 3, wherein the first information related to the capability of supporting the beam correspondence is set to a bit 0, based on the UE minimum peak EIRP requirement and UE minimum peak EIRP requirement being met with an uplink beam sweeping.

7. The method of claim 1, further comprising:
   transmitting an uplink signal to the base station.

8. A method for supporting beam correspondence, the method performed by a base station and comprising:
   receiving UE capability information from a UE (User Equipment);
   wherein the UE capability information includes first information related a capability of supporting beam correspondence,
   wherein the beam correspondence is determined based on at least a beam correspondence tolerance requirement,
   wherein the beam correspondence tolerance requirement includes a delta effective isotropic radiated power (EIRP) of 3 dB,
   wherein the delta EIRP of 3 dB is determined based on a first EIRP and a second EIRP,
   wherein the first EIRP is based on a beam the UE chooses, and
   wherein the second EIRP is the highest EIRP based on an uplink beam sweeping.

9. The method of claim 8, wherein the delta EIRP of 3 dB is determined at 85% of a cumulative distribution function (CDF).

10. The method of claim 8, wherein the beam correspondence is further determined based on at least one of a UE minimum peak EIRP requirement or a UE spherical coverage requirement.

11. The method of claim 8, wherein the first information related the capability of supporting the beam correspondence is set to a bit 1, based on that the UE minimum peak EIRP requirement and UE minimum peak EIRP requirement are met.

12. The method of claim 8, wherein the first information related to the capability of supporting the beam correspondence is set to a bit 0, based on the UE minimum peak EIRP requirement and UE minimum peak EIRP requirement being met with an uplink beam sweeping.

13. A base station to support beam correspondence, the base station comprising:
- at least one processor; and
- at least one computer memory operably connectable to the at least one processor and storing instructions that, when executed by the at least one processor, perform operations comprising:
  - receiving UE capability information from a UE (User Equipment);
  - wherein the UE capability information includes first information related a capability of supporting beam correspondence,
  - wherein the beam correspondence is determined based on at least a beam correspondence tolerance requirement,
  - wherein the beam correspondence tolerance requirement includes a delta effective isotropic radiated power (EIRP) of 3 dB,
  - wherein the delta EIRP of 3 dB is determined based on a first EIRP and a second EIRP,
  - wherein the first EIRP is based on a beam the UE chooses, and
  - wherein the second EIRP is the highest EIRP based on an uplink beam sweeping.

\* \* \* \* \*